United States Patent [19]

Puri et al.

[11] Patent Number: 4,578,086
[45] Date of Patent: Mar. 25, 1986

[54] METHOD FOR CONTROLLING BORIC ACID PARTICLE SIZE DISTRIBUTION

[75] Inventors: Avinash D. Puri, Ridgecrest; James L. Fairchild, Trona; James B. Rodosevich, Ridgecrest, all of Calif.

[73] Assignee: Kerr-McGee Chemical Corporation, Oklahoma City, Okla.

[21] Appl. No.: 528,956

[22] Filed: Sep. 2, 1983

[51] Int. Cl.$^4$ .............................................. B01D 9/02
[52] U.S. Cl. ..................................................... 23/300
[58] Field of Search ..................... 23/295, 300, 313 R, 23/313 P, 313 FB; 423/266, 283; 264/117

[56] References Cited

U.S. PATENT DOCUMENTS

| | | | |
|---|---|---|---|
| 3,883,640 | 5/1975 | Smart | 23/300 |
| 3,917,801 | 11/1975 | Wilson | 423/283 |
| 4,119,632 | 10/1978 | Newport, III et al. | 23/300 |

FOREIGN PATENT DOCUMENTS 142641  2/1961  U.S.S.R. .............................. 23/300

Primary Examiner—Hiram H. Bernstein
Attorney, Agent, or Firm—William G. Addison; John P. Ward

[57] ABSTRACT

Boric acid is crystallized from saturated aqueous solutions thereof by adding to the solutions small proportions of water soluble polymers which control the particle size distribution of the boric acid during crystallization.

7 Claims, 2 Drawing Figures

METHOD FOR CONTROLLING BORIC ACID PARTICLE SIZE DISTRIBUTION

FIELD OF THE INVENTION

This invention relates to a method of crystallizing boric acid. In particular the invention relates to a novel method for controlling the particle size distribution of boric acid crystallized from saturated aqueous feed solutions thereof.

BACKGROUND OF THE INVENTION

Boric acid, both technical and U.S.P. grades, is produced commercially by the reaction of borax ($Na_2B_4O_7 \cdot 10H_2O$) with sulfuric acid in an aqueous medium. The overall reaction that takes place between the borax and the sulfuric acid is represented by the following equation:

$$Na_2B_4O_7 \cdot 10H_2O + H_2SO_4 \rightarrow 4H_3BO_3 + Na_2SO_4 + 5H_2O$$

In a typical process borax and sulfuric acid (in stoichiometric proportions) and water are added to a reaction vessel and heated at elevated temperatures ranging from about 80° C. to about 90° C. Generally, however, temperatures in the range of from about 85° C. to about 90° C. are normally employed in most commercial processes. On completion of the reaction the reaction mixture is cooled to a temperature ranging from about 30° C. to about 40° C. in a crystallization or a series of crystallization vessels to cause the boric acid to crystallize out of and become suspended in the reaction medium. In addition to the technique of cooling the reaction mixture to crystallize the boric acid, evaporative and vacuum processes can also be employed to crystallize the boric acid. Regardless of the particular technique employed, the crystalline boric acid is then separated from the reaction medium or mother liquor by means of filtration and/or centrifugation and washed to remove residual impurities such as byproduct sodium sulfate.

Crystalline boric acid prepared by processes such as described above has been found to have a broad particle size distribution. Generally, however, said particles are of a mean particle size of about 190 to about 195 microns or less. Because of this small size, problems with subsequent purification, handling and storage are encountered which otherwise would not occur if crystalline boric acid having a mean particle size greater than about 190 to about 195 microns could be produced. Such small size also limits the end uses to which the boric acid can be applied.

SUMMARY OF THE INVENTION

The present invention provides a method for controlling particle size distribution of boric acid during the crystallization thereof from a saturated aqueous feed solution of said acid. In particular the method of this invention comprises adding to said aqueous acid solution at least one water soluble acrylamide homopolymer or copolymer thereof and crystallizing the boric acid from the aqueous acid solution.

DETAILED DESCRIPTION OF THE INVENTION

Figure 1:
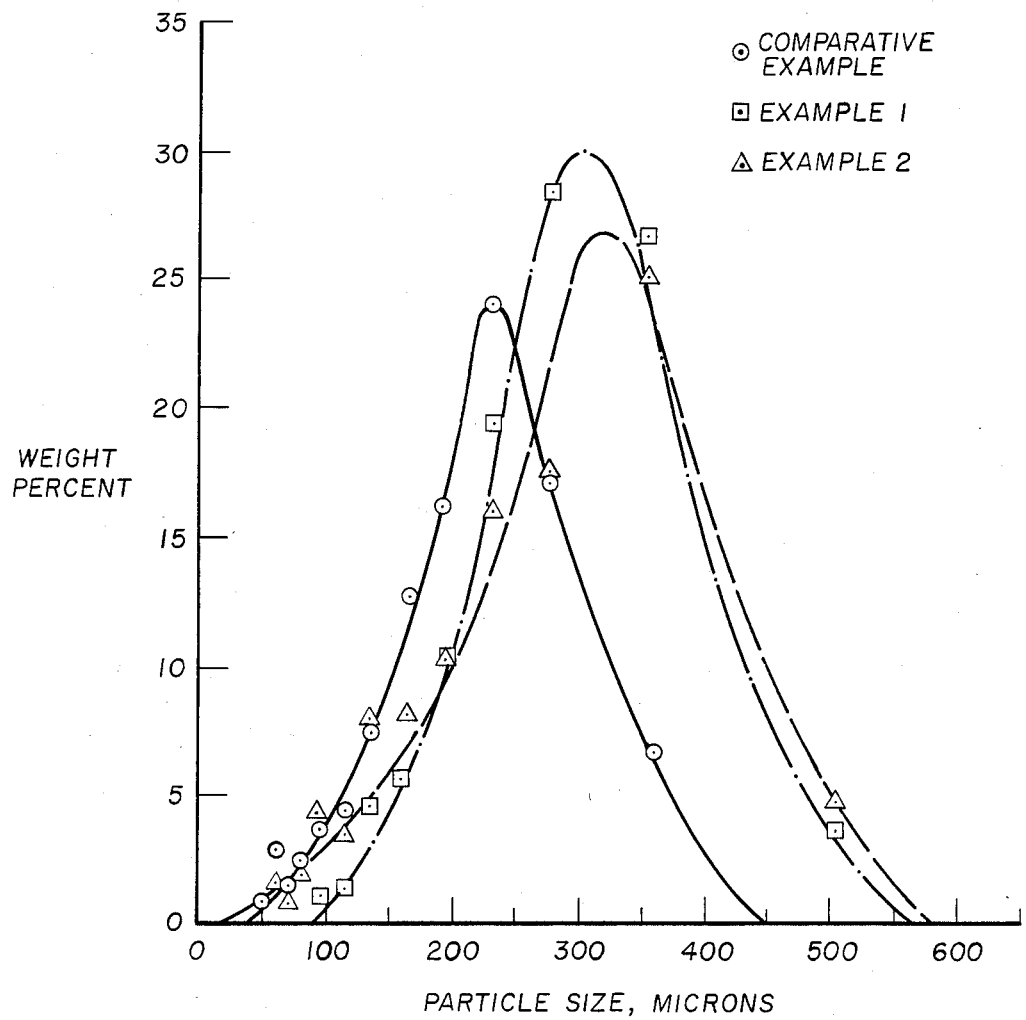
FIG. 1 shows the weight percent particle size distribution of boric acid crystals produced both with and without the use of a water soluble acrylamide homopolymer or copolymer thereof.

According to the novel method of this invention, control of the particle size distribution of boric acid during the crystallization of said acid from a saturated aqueous solution of said acid is achieved by adding to said saturated aqueous solution at least one water soluble acrylamide homopolymer or copolymer thereof. In the practice of this invention the exact point of addition of the homo- or copolymer is not critical, provided, however, that said polymeric materials must be present in the aqueous acid solution at the time of commencement of the formation of the boric acid crystals. Thus the homopolymer or copolymer can be added to the saturated aqueous solution of boric acid either prior to or concurrently with the addition of said solution to a crystallization vessel or vessels. In any event, it is most desirable that the polymeric material be present in the saturated aqueous solution prior to the onset of crystallization of the crystalline boric acid product.

Acrylamide and methacrylamide homopolymers and copolymers thereof useful in the present invention include those homopolymers and copolymers which are water soluble at the temperature at which crystallization of the boric acid commences. Acrylamide and methacrylamide homopolymers useful herein are those homopolymers containing repeating units of the structural formula $$-CH_2-CR- \atop | \atop O=C-NH_2 \qquad (I)$$

where R is selected from the group consisting of hydrogen atom and methyl radical.

Copolymers of acrylamide type monomers useful in the method of this invention include those copolymers containing repeating units corresponding to structural formula (I) defined hereinabove and repeating units corresponding to the structural formula $$-CH_2-CR_1- \atop | \atop O=C-X \qquad (II)$$

where $R_1$ is selected from the group consisting of hydrogen atom and methyl radical, X is a radical selected from the group consisting of the radicals $-NH_2$ and $-OY$ wherein Y is selected from the group consisting of hydrogen atom and alkaline metal ions such as sodium, potassium, rubidium, etc., provided, however, that when X is $-NH_2$, R and $R_1$ are not the same. Generally the copolymers as defined hereinabove can contain from 1% to about 99% of repeating units of structural formula (I) and from about 99% to 1% of repeat units of the structural formula (II). However, when X is the radical $-OY$ wherein Y is hydrogen or alkali metal, said copolymers will contain from about 99% to about 95% of repeating units of structural formula (I) and from 1% to about 5% of repeating units of the structural formula (II). Thus, the copolymers useful in this invention are nonionic or only slightly anionic in character. Representative examples of copolymers containing repeating units corresponding to structural formulae (I) and (II) include poly(methacrylamide/acrylamide) copolymer prepared by the addition polymerization of a mixture of methacrylamide and acrylamide monomers, poly(methacrylate/acrylamide) copolymer, poly(acrylate/acrylamide) copolymer and the like. The alkaline metal salts of said copolymers are also useful in the practice of the method of the present invention.

Methods for preparing the acrylamide and methacrylamide homopolymers and copolymers thereof useful herein are well known. Generally such homopolymers and copolymers are prepared by addition polymerization techniques employing initiators such as potassium persulfate, benzoyl peroxide, azoisobutyronitrile or t-butyhydroperoxide at temperatures ranging from about 60° C. to about 100° C. or by redox systems such as for example potassium persulfate-sodium thiosulfate initiated at room temperature. Copolymers containing carboxyl groups, i.e., where Y in structural formula (II) above is hydrogen, or carboxylic acid salts, i.e., where Y is an alkali metal ion, may be prepared by the copolymerization of acrylamide or methacrylamide monomer with methacrylic acid, acrylic acid or the alkali metal salts thereof or by acid or alkaline hydrolysis of the polyacrylamide or polymethacrylamide homopolymers. A more exhaustive teaching of various methods for preparing such polyacrylamide homo- and copolymers is found in *Kirk Othmer Encylclopedia of Chemical Technology*, Volume 1, pages 305-306, and Volume 17, page 403, Second Edition (1968), the teachings of which are incorporated herein in their entirety.

The acrylamide and methacrylamide homopolymers and copolymers described herein and found useful in the practice of this invention may be further characterized by having molecular weights ranging from about 200,000 up to about 5,000.000. A preferred molecular weight range will be between about 200,000 and 1,500,000 with the most preferred polymers having molecular weights of about 1,000,000.

The amount of acrylamide or methacrylamide homo- or copolymers employed in controlling the particle size distribution of crystalline boric acid crystallized from a saturated aqueous feed solution thereof can vary widely. Thus the amount of such homo- or copolymers can range from about 20 to about 150 parts per million parts (ppm) of feed solution. A more preferred range is from about 50 to about 100 ppm of feed solution.

The following examples are presented solely for the purpose of illustration and are not to be construed as limiting the invention in any manner and many variations of the invention are possible which do not depart from the spirit and scope hereof.

COMPARATIVE EXAMPLE

Five gallons of a commercially produced aqueous boric acid slurry containing 19.0 parts by weight of boric acid and 25.0 parts by weight of sodium sulfate is heated to a temperature of about 49° C. and filtered. The clear saturated aqueous boric acid filtrate is then added to a heated feed tank and the temperature of the clear filtrate equilibrated at about 54° C. The filtrate is then pumped to a jacketed crystallization apparatus equipped with an agitator and baffles at a rate of about 35 milliliters per minute. The crystallizer is maintained at a temperature of about 35° C. and a pressure of one atmosphere. Crystallization of the boric acid was complete after about 5.25 hours at which time the boric acid was classified by the use of various screens for determination of the particle size distribution. In this comparative example, no homo- or copolymer as described herein was employed to control the particle size distribution of the crystals of boric acid formed. As a result, the mean particle size of the boric acid crystals was about 193 microns (see FIG. 1) with only approximately 48% of the particles being greater than 230 microns in size.

EXAMPLES 1-2

Figure 2:
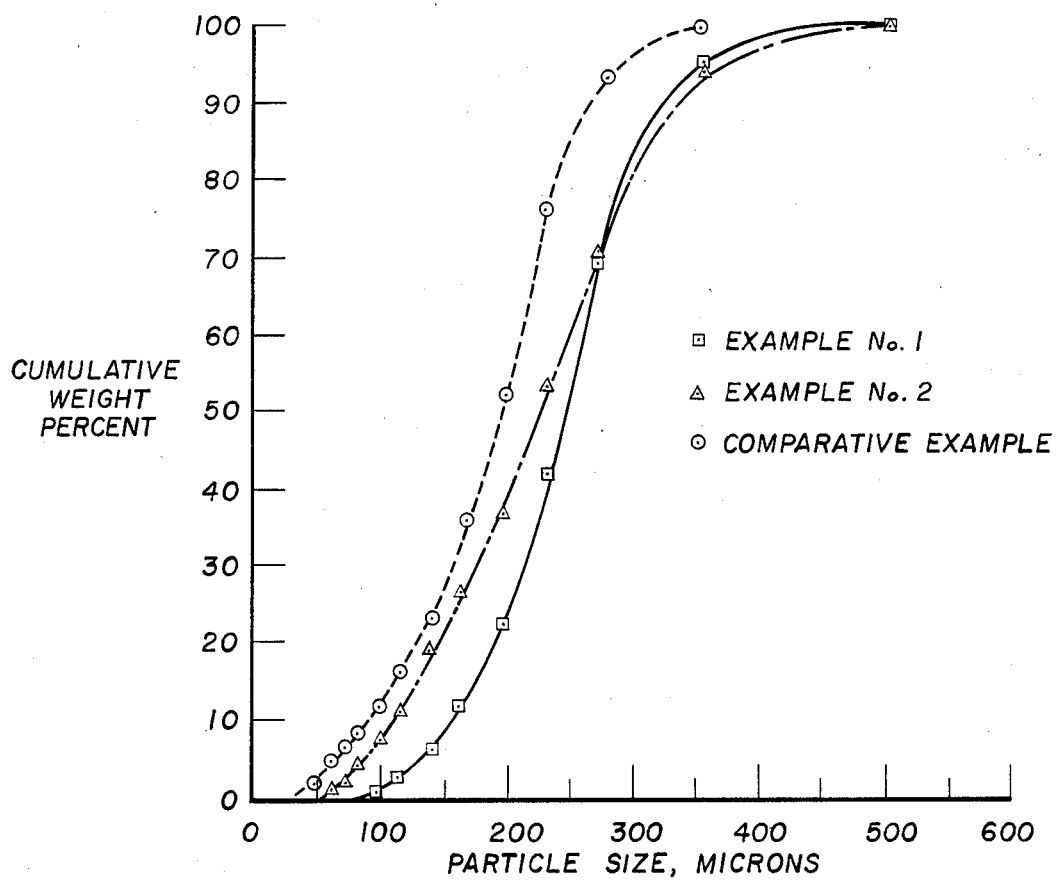
FIG. 2 shows the cumulative particle size distribution of boric acid crystals produced both with and without the use of a water soluble acrylamide homopolymer or copolymer thereof.

A series of crystallization experiments is performed employing a similar saturated aqueous boric acid solution and the same apparatus and procedures as employed in the Comparative Example above. However, in this series of crystallization experiments, various polyacrylamide polymers and copolymers are added to the filtered boric acid solution prior to feeding said solution to the crystallizer. In Example 1, 100 ppm of a nonanionic polyacrylamide polymer sold by the Nalco Chemical Company under the tradename Nalco 7871 is added to the clear saturated aqueous boric acid filtrate in the feed tank. In Example 2, 100 ppm of a slightly anionic polyacrylamide copolymer sold by the Nalco Chemical Company under the tradename Nalco 7872 is added to the filtrate. The filtrate in each of Examples 1 and 2 is then subjected to crystallization employing the same apparatus and procedures as employed in the Comparative Example immediately above. The crystalline boric acid is then subjected to screen analysis. In Example 1, the mean particle size of the crystalline boric acid is about 240 microns (see FIG. 1) with approximately 77.5% of the particles being equal to or greater than 230 microns (see FIG. 2). In Example 2, the mean particle size of said boric acid crystals is about 230 microns with approximately 63% of the particles being of this size or greater.

In addition to providing control over the particle size distribution of crystalline boric acid, a further advantage to be derived from the use of the present invention is that the resultant crystalline boric acid will have a higher bulk density. For example, it has been observed that the bulk density of crystalline boric acid can be increased from about 40 pounds per cubic foot to about 49 pounds per cubic foot employing the method of the invention. Such increased bulk density provides for greater ease of handling, packaging and storage of the boric acid.

While the present invention has been described with respect to what is believed to be the preferred embodiment thereof, it will be understood, of course, that certain changes, modifications and the like may be made therein without departing from the true scope of the present invention as set forth in the appended claims.

What is claimed is:

1. A method for controlling particle size distribution of boric acid during the crystallization of said acid from a saturated aqueous feed solution thereof comprising adding to said saturated solution prior to commencement of the crystallization of said acid at least one water soluble polymeric material, in an amount ranging from about 20 to about 150 parts per million, selected from the group consisting of:

A. homopolymers containing repeating units of the structural formula

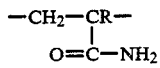  (I)

wherein R is selected from the group consisting of hydrogen atom and methyl radical, and B. copolymers containing from 1% to 99% of repeating units corresponding to structural formula (I) and from about 99% to 1% of repeating units corresponding to the structural formula

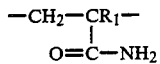  (II)

wherein $R_1$ is selected from the group consisting of hydrogen atom and methyl radical provided, however, that R and $R_1$ are not the same said homopolymers and copolymers having molecular weights ranging from about 200,000 up to about 5,000,000 and separating said crystallized boric acid by means selected from the group consisting of filtration and centrifugation.

2. The method of claim 1 wherein the water soluble polymeric materials is a homopolymer having repeating units of structural formula (I).

3. The method of claim 2 in which the water soluble polymeric material is a homopolymer having repeating units of structural formula (I) wherein R is a hydrogen atom.

4. The method of claim 1 wherein the water soluble polymeric material is a copolymer having repeating units of structural formulae (I) and (II).

5. The method of claim 4 in which the water soluble polymeric material is a copolymer having repeating units of structural formula (I) wherein R is hydrogen atom and repeating units of structural formula (II) wherein $R_1$ is methyl radical.

6. The method of claim 1 wherein the amount of water soluble polymeric material added to said supersaturated aqueous solution of boric acid ranges from about 20 to about 150 parts per million parts of boric acid feed solution.

7. The method of claim 6 wherein the amount of said water soluble polymeric material added ranges from about 50 to about 100 parts per million parts of boric acid feed solution.

* * * * *